(12) United States Patent
Wang et al.

(10) Patent No.: US 9,218,491 B2
(45) Date of Patent: Dec. 22, 2015

(54) SYSTEMS AND METHODS FOR PROVIDING SECURITY IN AN ELECTRONIC DEVICE

(75) Inventors: Lan Wang, Cypress, TX (US); Valiuddin Y. Ali, Cypress, TX (US); James L. Mondshine, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/640,031

(22) PCT Filed: Apr. 13, 2010

(86) PCT No.: PCT/US2010/030944
§ 371 (c)(1),
(2), (4) Date: Oct. 8, 2012

(87) PCT Pub. No.: WO2011/129815
PCT Pub. Date: Oct. 20, 2011

(65) Prior Publication Data
US 2013/0042321 A1 Feb. 14, 2013

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |

(Continued)

(52) U.S. Cl.
CPC ............ G06F 21/575 (2013.01); G06F 21/445 (2013.01); G06F 21/73 (2013.01)

(58) Field of Classification Search
CPC ..... G06F 21/34; G06F 21/73; G06F 11/2247; G06F 11/2289

USPC ................................................. 726/22; 713/2
See application file for complete search history.

(56) References Cited

U.S. PATENT DOCUMENTS 5,802,592 A * 9/1998 Chess et al. ........................ 713/2
6,161,177 A * 12/2000 Anderson ........................ 713/2
(Continued)

FOREIGN PATENT DOCUMENTS

| CN | 1629764 | 6/2005 |
|---|---|---|
| CN | 101373437 | 2/2009 |

(Continued)

OTHER PUBLICATIONS

PCSTATS, "ASUS Striker II nVidia nForce 790i SLI Motherboard Review," [online] 2009, http://www.pcstats.com/articleview.cfm?articleid=2375&page=5 (Accessed: May 29, 2015).*

(Continued)

*Primary Examiner* — Dede Zechner
*Assistant Examiner* — Vadim Savenkov
(74) *Attorney, Agent, or Firm* — HP Legal Department (57) ABSTRACT

Security methods are provided. The method can include comparing a first device identifier (125) disposed within a component (120) with a second device identifier (135) disposed within an immutable memory (130). The component and the immutable memory can be disposed at least partially within an electronic device (110). The method can include starting the electronic device normally if the first device identifier corresponds to the second device identifier. The method can further include providing at least one indicator (150) if the first device identifier fails to correspond to the second device identifier. Security systems are also provided.

19 Claims, 4 Drawing Sheets

(51) Int. Cl.
*G06F 21/57* (2013.01)
*G06F 21/73* (2013.01)
*G06F 21/44* (2013.01)

(56) References Cited

U.S. PATENT DOCUMENTS

| | | | |
|---|---|---|---|
| 6,625,730 B1 * | 9/2003 | Angelo et al. | 713/2 |
| 6,990,600 B2 * | 1/2006 | Ryan et al. | 714/3 |
| 7,269,725 B2 * | 9/2007 | Cromer et al. | 713/2 |
| 7,475,236 B2 * | 1/2009 | Chen et al. | 713/2 |
| 7,489,245 B2 * | 2/2009 | August et al. | 340/572.1 |
| 7,558,969 B1 | 7/2009 | Lucero et al. | |
| 8,100,323 B1 * | 1/2012 | Crews et al. | 235/379 |
| 8,103,862 B2 * | 1/2012 | Rangarajan et al. | 713/2 |
| 2004/0170068 A1 | 9/2004 | Williams | |
| 2005/0132177 A1 * | 6/2005 | Challener et al. | 713/1 |
| 2006/0129848 A1 | 6/2006 | Paksoy et al. | |
| 2008/0040619 A1 * | 2/2008 | Dublish et al. | 713/193 |
| 2008/0099313 A1 * | 5/2008 | Dhir | 200/51.12 |
| 2009/0132829 A1 | 5/2009 | Ohhashi | |
| 2009/0222635 A1 | 9/2009 | Challener et al. | |
| 2009/0254753 A1 | 10/2009 | De Atley et al. | |
| 2009/0327678 A1 * | 12/2009 | Dutton et al. | 713/2 |
| 2010/0235648 A1 * | 9/2010 | Hoang et al. | 713/189 |
| 2011/0023106 A1 * | 1/2011 | Murotake et al. | 726/24 |

FOREIGN PATENT DOCUMENTS

| | | |
|---|---|---|
| WO | WO-2009/123631 A1 | 10/2008 |
| WO | WO-2009/134270 A1 | 11/2009 |

OTHER PUBLICATIONS

International Search Report and Written Opinion received in related PCT Application No. PCT/US2010/030944, mailed Mar. 20, 2012, pp. 10.

Chinese Office Action cited in Application No. 201080067405.7; mailed Sep. 29, 2014; 14 pages.

* cited by examiner

SYSTEMS AND METHODS FOR PROVIDING SECURITY IN AN ELECTRONIC DEVICE

BACKGROUND OF THE INVENTION

With an increasingly mobile worldwide populace, computing devices are frequently being transported across the face of the globe. When passing through security checkpoints, for example security checkpoints found in many of the world's airports, computing devices may be subjected to a "power on" test to ascertain that the device is actually a computing device, and to ascertain whether the computing device contains legitimate hardware, firmware, or software. While such tests can be effective at detecting counterfeit computing devices, they are often incapable of detecting whether the hardware, firmware or software contained in the computing device has been compromised, altered, or counterfeited. The problem becomes particularly acute when one or more security devices within the computing device have been compromised, altered, or removed.

BRIEF DESCRIPTION OF THE DRAWINGS

Advantages of one or more disclosed embodiments may become apparent upon reading the following detailed description and upon reference to the drawings in which.

DETAILED DESCRIPTION

With a plethora of portable electronic devices, such as laptop and portable computers, disposed among an increasingly mobile world population, the security of the portable electronic device itself and the data contained therein have come under increased scrutiny due to the potential security threat presented by such devices and the data they contain. While varying test methods have been developed and employed to detect counterfeit, altered, or otherwise compromised electronic devices, a simple test system or method to detect whether a portable electronic device has been compromised would provide security personnel with the ability to detect and halt the transport of such devices. To accomplish this task, security systems useful in detecting counterfeit, altered, or otherwise compromised electronic devices are provided herein. Additionally, security methods useful in detecting counterfeit, altered, or otherwise compromised electronic devices are also provided herein.

Security methods are provided. The method can include comparing a first device identifier disposed within a component with a second device identifier disposed within an immutable memory. The component and the immutable memory can be disposed at least partially within an electronic device. The method can include starting the electronic device normally if the first device identifier corresponds to the second device identifier. The method can further include providing at least one indicia if the first device identifier fails to correspond to the second device identifier.

Security systems are also provided. The system can include a component having a first device identifier and an immutable memory having a second device identifier. The system can further include an algorithm, which when executed by the system, can compare the first security device identifier to the second security device identifier. If at least a portion of the first device identifier corresponds to at least a portion of the second device identifier the system can start normally. If the first device identifier fails to correspond to the second device identifier the system can provide at least one indicator.

Figure 1:
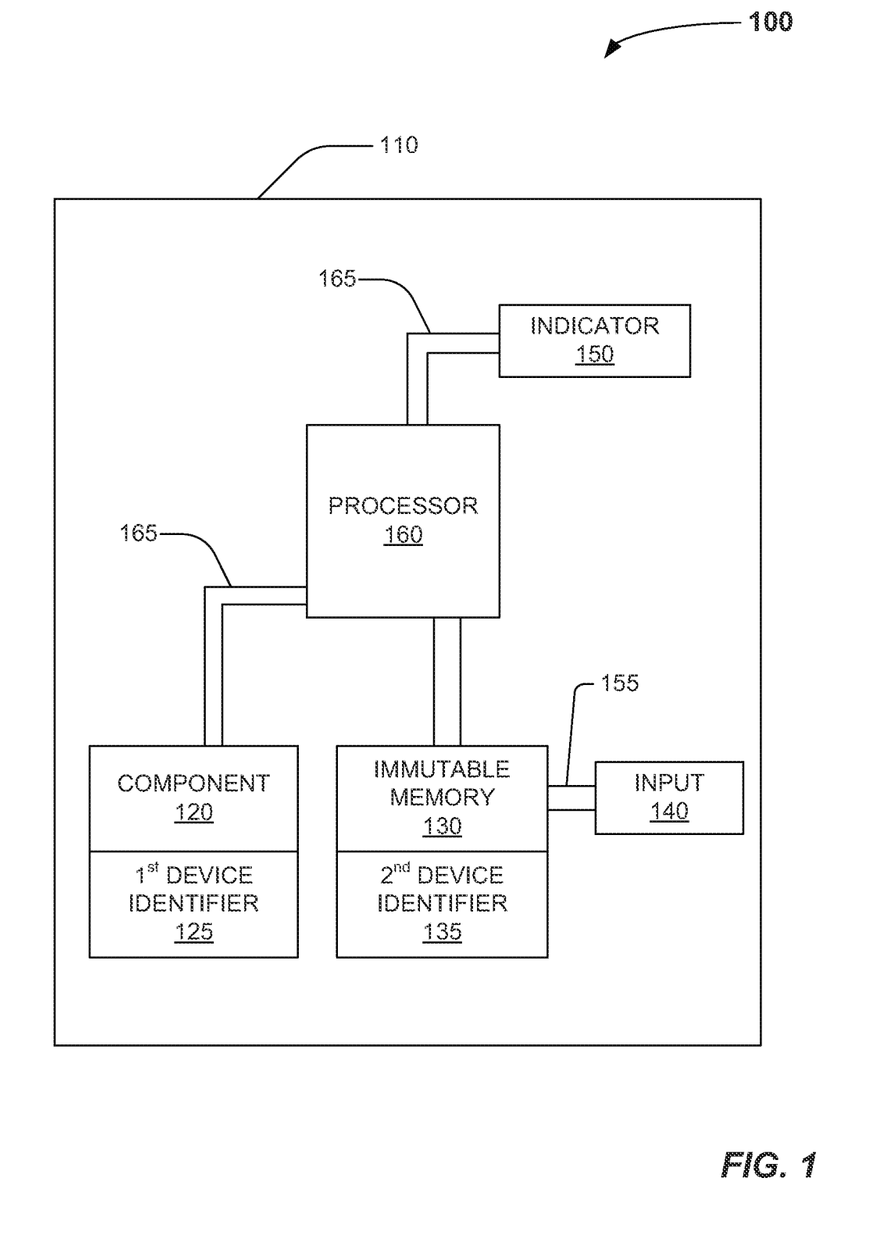
FIG. 1 is a schematic diagram depicting an illustrative security system, according to one or more embodiments described herein.

Referring now to FIG. 1, an example security system 100 is provided. The system 100 can include an electronic device 110 having a component 120, an immutable memory 130, an input 140, an indicator 150, and a processor 160 at least partially disposed within. A first device identifier 125 can be disposed at least partially within the component 120. A second device identifier 135 can be disposed at least partially within the immutable memory 130. The electronic device 110 can include any device having at least a portion of the listed elements disposed therein. Such electronic devices can include, but are not limited to, a laptop computer, a portable computer, a netbook computer, a slate computer, a tablet computer, a personal digital assistant, a cellular communications device, or a handheld gaming device.

The component 120 can include any device adapted to provide, generate, or store a unique first device identifier 125. The component 120 can, in some embodiments, include one or more devices non-detachably attached to the electronic device 110, for example the component 120 can include one or more surface-mount devices, e.g. one or more devices soldered directly to a circuit board disposed at least partially within the electronic device 110. In some embodiments, the component 120 can be non-detachably or otherwise permanently attached to the electronic device 110 in such a manner that the removal of the component 120 renders the electronic device inoperable. In other embodiments, the component 120 can include one or more devices detachably attached to the electronic device 110, for example one or more socket-mount devices.

In some embodiments, the component 120 can include a non-volatile storage device such as a memristor, read-only memory (ROM), or flash memory. The component 120 can include one or more platform specific modules, one or more temporal specific modules, one or more geographic specific modules, or any combination thereof. In some embodiments, the component 120 can include a Trusted Platform Module ("TPM"), a Trusted Crypto Module ("TCM"), or similar security devices. In at least some embodiments, the component 120 can be communicatively coupled to the immutable memory 130, or the processor 160 via one or more conduits 165.

As used herein, the term "couple" or "coupled" or components that are referred to as in a state of being "coupled" can refer to any form of direct, indirect, optical or wireless electrical connection. The electrical connection can, in one or more embodiments, include, but is not limited to any electrically conductive or magnetically inductive connection linking two or more devices. The connection can be electrically conductive, for example using one or more conductors such as copper or aluminum wire, conductive strips on a printed circuit board, or the like to connect two or more components. The connection can be magnetically inductive, for example, stimulating the flow of current from a transformer secondary coil by passing a current through a primary coil inductively coupled to the secondary coil. The connection can be electromagnetic, for example by controlling current flow through a relay contact via an independent relay coil such that passage of a current through the relay coil can magnetically open and close the relay contact.

Where the component 120 includes a platform specific module such as a TPM, the TPM can include any number of devices, systems, or combination of systems and devices compliant with the most recent TPM specification issued by the Trusted Computing Group. In some embodiments, a hash key summary can be disposed within a portion of the TPM to indicate the "as manufactured" or "as initially configured" hardware and software configuration of the electronic device 110. In some embodiments, a unique RSA (encryption key) can be disposed, stored, or otherwise embedded within the TPM at the time of production of the electronic device 110. Thus, where the component 120 incorporates a TPM, a first device identifier 125 in the form of one or more hash key strings, encryption keys, or other similar identifiers can be used to uniquely distinguish not only a specific electronic device 110, but also, in some instances the hardware, firmware, and software configuration of the electronic device 110.

Where the component 120 includes a platform specific module such as a TCM, the TCM can include any number of devices, systems, or combination of systems and devices suitable for providing at least one encryption key. In some embodiments, a unique private key can be disposed within a portion of the TCM at the time of production of the electronic device 110. Where the component incorporates a TCM, a first device identifier 125 in the form of one or more encryption keys, or other similar identifiers can be used to uniquely distinguish a specific electronic device 110.

Where the component 120 includes a geographic specific module, the component 120 can include any number of devices, systems, or combination of systems and devices suitable for providing a first device identifier 125 based in whole or in part upon the geographic location of the electronic device 110. Various methods can be employed by the geographic specific module to ascertain the location of the electronic device 110. In one example, a Global Positioning System ("GPS") receiver can be incorporated into the geographic specific module to provide a device location using one or more GPS signals. In another example, the geographic specific module can determine the physical location of the electronic device 110 using an internet protocol ("IP") address detected, for example, via a network interface card ("MC") disposed within the electronic device. In yet another example, the geographic specific module can determine the physical location of the electronic device 110 using one or more cellular communication signals, for example, via one or more global system for mobile communications ("GSM") receivers, or via one or more code division multiple access ("CDMA") receivers. Thus, in at least some embodiments, the physical location of the electronic device 110 can provide at least a portion of the first device identifier 125.

Where the component 120 includes a temporal specific module, the component 120 can include any number of devices, systems, or combination of systems and devices suitable for providing a first device identifier 125 based in whole or in part upon one or more temporal indicia, for example a real time clock ("RTC"), an elapsed time clock ("ETC"), or the like. Various methods can be used to ascertain the temporal indicia, for example, the component 120 can include an ETC that is activated upon accomplishment of a specific event, for example initial activation of the electronic device 110 or one or more firmware or software routines disposed in the electronic device 110. Thus, in at least some embodiments, at least one temporal indicia associated with the electronic device 110 can provide at least a portion of the first device identifier 125.

It can therefore be seen that the first unique identifier 125, can include any data suitable for uniquely identifying the electronic device 110. In some embodiments, the first unique identifier 125 can include any data suitable for identifying one or more system parameters, for example a hardware, software, or firmware configuration of the electronic device 110. In some embodiments, the first device identifier 125 can include any data suitable for determining one or more physical parameters, for example the physical location or elapsed operating time associated with a particular electronic device 110. In some embodiments the first device identifier 125 can include any combination of unique identification data, system parameter data, and physical parameter data disposed within the component 120.

The immutable memory 130 can be disposed at least partially within the electronic device 110. The immutable memory can include any type of permanent, non-volatile storage device—examples include memristors, read only memory ("ROM"), flash memory, and the like. The immutable memory 130 can include any number of systems, devices, combination of systems and devices suitable for permanently storing data. In some embodiments, the immutable memory 130 can be a dedicated non-volatile memory module. In other embodiments, the immutable memory 130 can be a non-volatile portion of a larger volatile or non-volatile memory module. For example, in some embodiments, the immutable memory 130 can be a non-volatile memory module disposed at least partially within a Basic Input/Output System ("BIOS") memory module disposed within the electronic device 110.

The immutable memory 130 can, in some embodiments, execute a series of machine readable instructions that compare at least a portion of the first device identifier 125 with at least a portion of the second device identifier 135. In some embodiments, the immutable memory 130 can include a system BIOS capable of performing a power-on self test ("POST") followed by execution of one or more sets of machine readable instructions, for example instructions to activate one or more sub-systems, such as a GPS receiver, NIC, ETC, or RTC, disposed within the electrical device 110. If at least a portion of the first device identifier 125 corresponds to at least a portion of the second device identifier 135, the electronic device 110 can be permitted to perform a specific action, for example executing a machine readable series of instructions associated with a boot routine to routinely start the electronic device 110. If at least a portion of the first device identifier 125 fails to correspond to at least a portion of the second device identifier 135, at least one indicator 150 can be provided by the electronic device to indicate the failed correlation. For example, in the event of a failed correlation between at least a portion of the first device identifier 125 and at least a portion of the second device identifier 135, the electronic device can illuminate a predetermined series of indicators 150, sound a distinctive indicator 150, or generate a predetermined RF signal indicator 150.

The second device identifier 135 can be disposed, written, stored, or otherwise embedded in whole or in part within the immutable memory 130. The second device identifier 135 can include any data useful in identifying one or more electronic device parameters. In some embodiments, the second device identifier 135 can include a unique identification data structure disposed within the immutable memory 130, for example a unique identification string written into the immutable memory by the electronic device manufacturer. In some embodiments, the second device identifier 135 can include data structure indicating a geographic area where the operation or functionality of the electronic device 110 is permitted or prohibited. The geographic area can be inclusive or exclusive, for example an inclusive data structure might indicate the electronic device 110 is authorized to operate only within the United States, or alternatively, an exclusive data structure might indicate the electronic device 110 is authorized to operate in any area except the United States. In some embodiments, the second device identifier 135 can include data indicating a temporal limit where the electronic device 110 is permitted to operate, for example a data string indicating the electronic device 110 is authorized to operate only for 500 hours.

The input 140 can include any number of systems, devices, or any combination of systems and devices suitable for providing an input signal to the electronic device 110. In its most basic form, the input 140 can be as simple as a switch disposed on the electronic device 110, for example a "power" or "test" switch. In some embodiments, the input 140 can include one or more devices adapted to provide a variable input to the electronic device 110, for example a keyboard or a mouse input. In at least some embodiments, the input 140 can be communicatively coupled to the immutable memory 130 or the processor via one or more conduits 155.

In some embodiments, a user can activate the input 140, for example by pressing a power button disposed on the electronic device 110. In response to the user activation of the power button input 150, the electronic device 110 can commence a bootstrap ("boot") sequence. In other embodiments, a user can activate the input 140, for example by depressing a "test" button disposed on the surface of the electronic device 110. In response to the user activation of the test button input 150, the electronic device 110 can enter a security test mode and commence execution of one or more test sequences. In some embodiments, the boot or test sequence can be invisibly performed by the electronic device 110 (i.e. performed without providing an external indication to a user).

The indicator 150 can include any number of systems, devices, or any combination of systems and devices suitable for providing any tangibly or intangibly detectable indication. In some embodiments, the indicator 150 can include any tangibly detectable event, for example an event detectable using one or more of the human senses of sight, hearing, touch, smell, or taste. In some embodiments, the indicator 150 can include any tangibly undetectable event, for example an event undetectable using one or more of the human senses, for example a radio frequency ("RF") signal. In some embodiments, the operation of the indicator 150 can provide an indication of whether the electronic device 110 is functioning normally, for example during a normal boot or test sequence. In some embodiments, the indicator 150 can be disposed on or about the electronic device 110, for example one or more illuminated devices or audible speakers disposed on the surface of the electronic device 110. In some embodiments, the indicator 150 can be partially or completely disposed within the electronic device 110, for example a radio frequency transmitter disposed within the electronic device 110.

In at least some embodiments, the indicator 150 can be communicatively coupled to the processor 160, the component, 120, the immutable memory 130, or any combination thereof via one or more conduits 165.

The processor 160 can include any number of systems, devices, or any combination of systems and devices suitable for executing a set of machine readable instructions. In some embodiments, the processor 160 can include a system or device dedicated to executing a set of machine readable instructions, for example a central processing unit ("CPU") disposed within a computing device. In some embodiments, the processor 160 can include one or more shared systems or devices disposed within an electronic device, for example one or more coprocessors disposed within a computing device.

The processor 160 can, in some embodiments, execute a series of machine readable instructions that compare at least a portion of the first device identifier 125 with at least a portion of the second device identifier 135. If at least a portion of the first device identifier 125 corresponds to at least a portion of the second device identifier 135, the electronic device 110 can be permitted to perform a specific action, for example executing a machine readable series of instructions associated with a boot routine to routinely start the electronic device 110. If at least a portion of the first device identifier 125 fails to correspond to at least a portion of the second device identifier 135, at least one indicator 150 can be provided by the electronic device to indicate the faded correlation. For example, in the event of a failed correlation between at least a portion of the first device identifier 125 and at least a portion of the second device identifier 135, the electronic device can illuminate a predetermined series of indicators 150, sound a distinctive indicator 150, or generate a predetermined RF signal indicator 150.

The correlation or relationship between the first device identifier 125 and the second device identifier 135 can include one or more portions of device identification data, device configuration data, device geographic data, device temporal data, or combinations thereof. In some embodiments, the first device identifier 125 can include a unique equipment identifier embedded in the component 120 by the device manufacturer while the second device identifier 135 can include the identical unique device identifier embedded in a portion of the immutable memory 130 disposed within the electronic device 110. Comparing the first device identifier 125 with the second device identifier 135 can, in such embodiments, provide an indication of whether the original component 120 has been replaced with a substitute. For example comparing the first device identifier 125 disposed in a Trusted Platform Module 120 within a computing device with the second device identifier 135 disposed in an immutable portion of the system BIOS 130 can provide an indication of whether the original TPM 120 has been replaced or the original software, firmware, or hardware configuration of the electronic device 110 has been changed.

In some embodiments, the first unique identifier 125 can include an identifier derived in whole or in part from the physical location of the electronic device 110, for example from a GPS receiver, a cellular receiver, or a NIC adapter, disposed within the electronic device 110. The second unique identifier 135 can include in whole or in part, a listing of geographic regions where the operation of the electronic device 110 is permitted or prohibited. For example, the first unique identifier 125 can be derived using a GPS receiver disposed within a tablet computing device 110. In such an embodiment, the first unique identifier may indicate the physical location of the computing device 110 as being within in Boston, Mass. The second unique identifier 135, disposed in an immutable portion 130 of system BIOS, can designate the state of Massachusetts as a permitted area for use of the electronic device 110. When, as in this example, the first device identifier (e.g. Boston, Mass.) corresponds wholly or partially with the second device identifier (e.g. within Massachusetts), the processor 160 can permit normal operation of the electronic device. On the other hand, should the first device identifier 125 indicate a physical location of Bangor, Me., the first device identifier (e.g. Bangor, Me.) and the second device identifier (e.g. within Massachusetts) would not correspond, and the processor 160 can provide at least one indicator 150 in response.

In some embodiments, the first unique identifier 125 can include an identifier derived in whole or in part from one or more temporal parameters associated with the electronic device 110, for example data collected using a real time clock ("RTC") or an elapsed time clock disposed within the electronic device 110. The second unique identifier 135 can include in whole or in part, a temporal or time-based range over which operation of the electronic device 110 is permitted or, alternatively, prohibited. For example, the first unique identifier 125 can be derived using data collected from an elapsed time clock disposed within a portable computing device 110. In such an embodiment, the first unique identifier may indicate the elapsed time that the portable computing device 110 has operated. The second unique identifier 135, disposed in an immutable portion 130 of system BIOS, can designate the amount of time for which the portable computing device 110 is authorized to operate. In such an instance, the first device identifier 125 (elapsed time) and the second device identifier 135 (authorized time) can be compared, and if the elapsed time is less than the authorized time, normal operation of the portable computing device 110 can be permitted. On the other hand, should the first device identifier 125 (elapsed time) be greater than the second device identifier (authorized time), the first and second device identifiers would not correspond, and the processor 160 can provide at least one indicator 150 in response.

Figure 2:
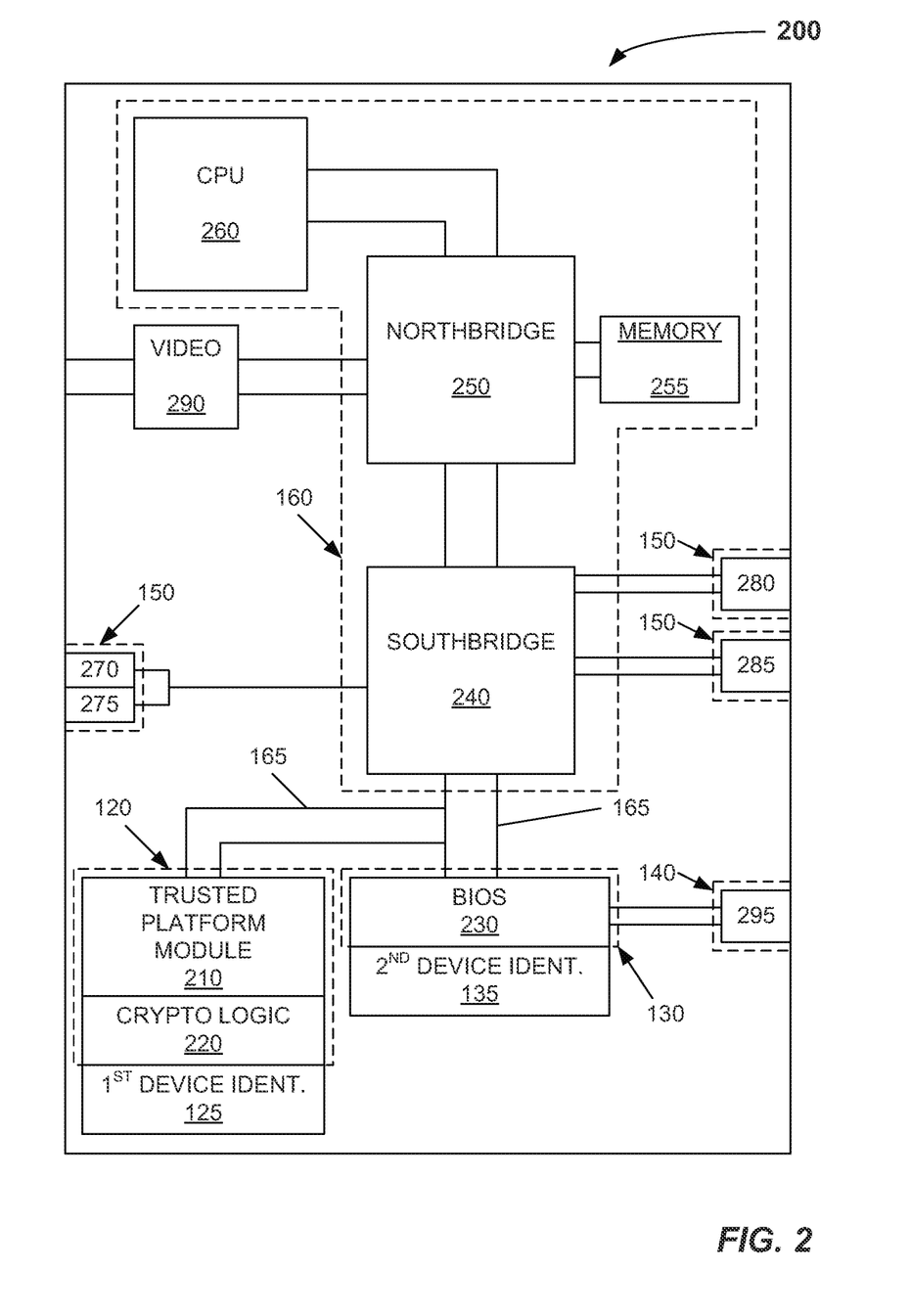
FIG. 2 is a schematic diagram depicting another illustrative security system, according to one or more embodiments described herein.

Referring now to FIG. 2, a computing device 200 is provided as an example electronic device 110. In some embodiments, the computing device 200 can include a component 120 such as a Trusted Platform Module ("TPM") incorporating firmware 210 and crypto logic 220. A first device identifier 125 can be wholly or partially disposed, stored, or otherwise embedded within the TPM 120. The computing device 200 can also include an immutable memory 130 disposed at least partially within the system BIOS 230. A second device identifier 135 can be wholly or partially disposed within the system BIOS 230 immutable memory 130.

The computing device 200 can also include a processor 160 incorporating a Southbridge 240, a Northbridge 250, a memory module 255, and a Central Processing Unit ("CPU") 260. In some embodiments, the Southbridge 240 portion of the processor 160 can be communicatively coupled to one or more indicator 150, for example one or more visual indicators 270, one or more audio indicators 275, or any combination thereof. In some embodiments, the Southbridge 240 portion of the processor 160 can be communicatively coupled to one or more indicator 150, for example one or more RF indicators 285, one or more Bluetooth indicators 280, or any combination thereof. In some embodiments, the Southbridge 240 portion of the processor 160 can be communicatively coupled to the immutable memory 130 (e.g. the system BIOS 230) and the component 120 (e.g. the TPM 210, 220) via one or more conduits 165.

The computing device 200 can also include one or more video outputs 290. In at least some embodiments, the one or more video outputs 290 can be communicatively coupled to the Northbridge 250 portion of the processor 160 via one or more conduits. In some embodiments, the computing device 200 can also include a power button 295 which can function as an input device 140. The power button 295 can be communicatively coupled to the system bios 230 via one or more conduits. In some embodiments, the computing device 200 can also include a test button 295 which can function as an input device 140. The test button 295 can be communicatively coupled to the system bios 230, the Southbridge 240, the Northbridge 250, or any combination thereof via one or more conduits.

The at least partial integration of the component 120 into a TPM and the at least partial integration of the immutable memory 130 into system BIOS 230 provide just one example of the physical disposal of the first device identifier 125 and the second device identifier 135. Other embodiments, where the first device identifier 125, the second device identifier 135, or both the first and second device identifiers, are disposed, stored, or embedded in alternate locations within the electronic device 100, or within a computing device 200, are possible.

Figure 3:
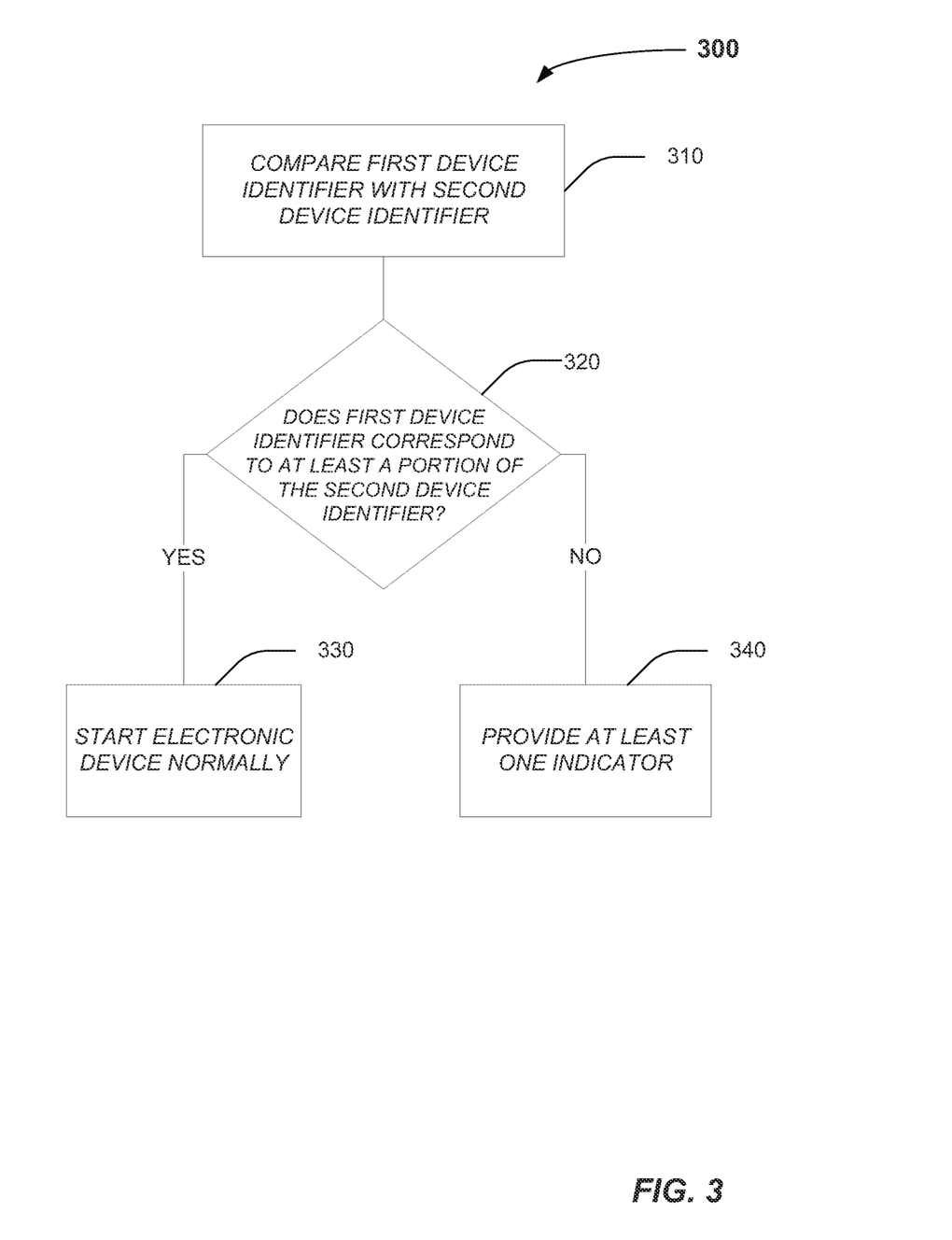
FIG. 3 is a flow diagram depicting an illustrative security method, according to one or more embodiments described herein.

Referring to FIG. 3, an example security method 300 is provided. The method can include comparing a first device identifier 125 with a second device identifier 135 at 310. In some embodiments, the first device identifier 125 can be a predetermined data structure, for example where the first device identifier 125 is stored or otherwise embedded in the component 120 by the device manufacturer. In some embodiments, the first device identifier 125 can in whole or in part, be a data sequence formed using one or more variables, for example the output of a network interface card ("NIC"), or a GPS receiver (i.e., physical location data), or the output from a timing device such as a real time or elapsed time clock (i.e., temporal data). The second device identifier 135 can include one or more data structures disposed, stored, or otherwise embedded in an immutable memory 130 by the device manufacturer.

Where identification data forms at least a portion of the first device identifier 125, the comparison at 310 can include comparing at least a portion of the first device identifier 125 obtained from the component 120 with a second device identifier 135 obtained from the immutable memory 130. Where location information, for example data supplied from a NIC or GPS, forms at least a portion of the first device identifier 135, the comparison at 310 can include comparing at least a portion of the first device identifier 125 with permissible or prohibited location data disposed within the immutable memory 130. Where temporal information, for example data supplied in whole or part from an RIC or an ETC, forms at least a portion of the first device identifier 135, the comparison at 310 can include comparing at least a portion of the first device identifier 125 with temporal data disposed within the immutable memory 130.

If at least a portion of the first device identifier 125 corresponds to at least a portion of the second device identifier 135 at 320, the device 100 can start normally at 330. If at least a portion of the first device identifier 125 fails to correspond to at least a portion of the second device identifier 135 at 320, the device 100 can provide at least one indicator 150 at 340. Starting the device 100 normally at 330 can include placing the device 100 in a state where a user can freely interact with the device without the presence of one or more software, firmware, or hardware limitations. Providing at least one indicator 150 at 340 can include providing one or more indicators including one or more visual indicators, one or more audible indicators, one or more radio frequency indicators, or the like.

Figure 4:
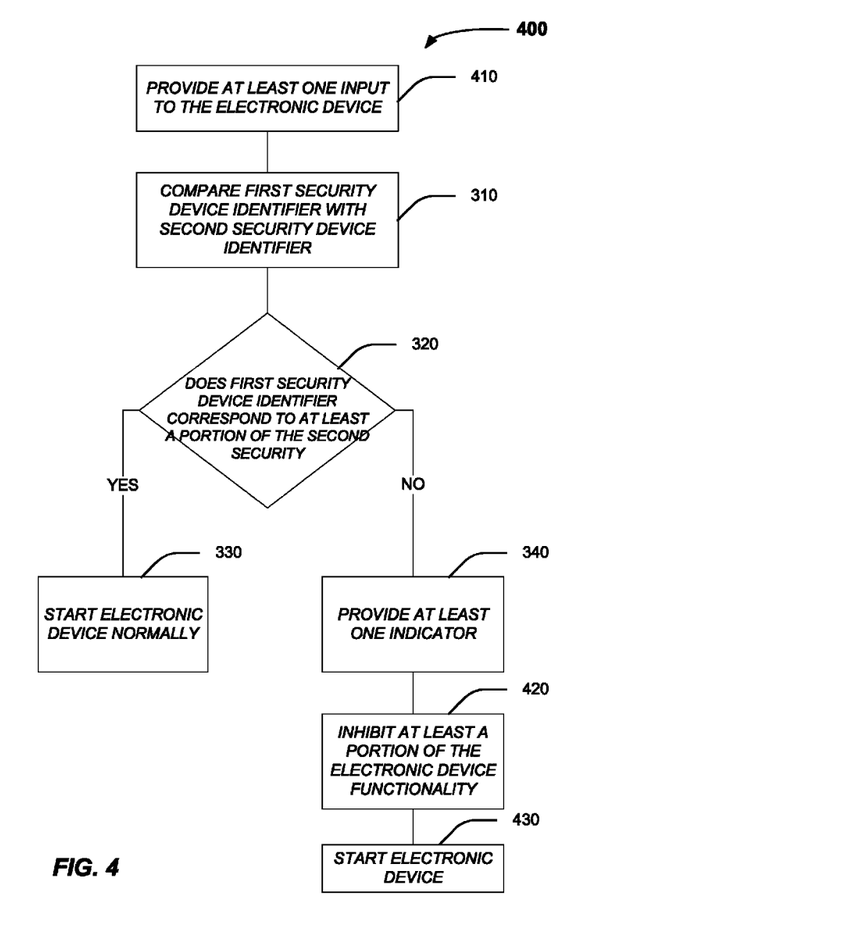
FIG. 4 is a flow diagram depicting another illustrative security method, according to one or more embodiments described herein.

Referring to FIG. 4, another example security method 400 is provided. In some embodiments, the comparison of the first device identifier 125 and the second device identifier 135 at 310 can be initiated by an action supplied by a user of the electronic device. For example, the user can supply at least one input to the electronic device at 410. In some embodiments, the input 140 can include activating the power switch for the electronic device 110. In some embodiments, the input 140 can include activating a security test mode, for example by activating an input 140 disposed in, on, or about the device 100.

In the event the first device identifier 125 and the second device identifier 135 fail to correspond, after providing at least one indicator (at 340), at least a portion of the electronic device functionality can be inhibited (at 420). Such inhibition can affect the functionality, speed, or other similar parameters of the electronic device. For example, a device having a geographic-based first device identifier 125 that is transported to an area not identified as a permissible operating area by the second device identifier 135 can be completely inhibited from functioning. In another example, a device having a temporal-based first device identifier 125 that exceeds a predetermined threshold embedded in the second device identifier 135 can inhibit or affect the performance of the electronic device 110, for example by reducing the dock speed of the processor 160.

Applying the method 400 described in FIG. 4 to the computing device 200, described in detail with reference to FIG. 2, the exemplary security process method 400 can be further described. A user can commence execution of the method 400 by pressing the on/off button 295 disposed on the surface of the computing device 200 (at 410). After conducting a power on self-test ("POST"), the BIOS 230 can enable the necessary system devices, for example an onboard NIC, GFS receiver, RTC or ETC to perform the security method. Where no system devices are used, for example when preloaded identification data is used as the first device identifier 125, the BIOS 230 can proceed without enabling any additional system resources on the computing device 200. Depending upon the configuration of the electronic device 200, the first device identifier 125 can be preloaded into a TPM 210 disposed within the device, or generated in whole or in part using one or more system resources such as the system NIC, GPS, ETC or RTC.

After completing the POST, the BIOS 230 can compare (at 310) the second device identifier 135 disposed in the immutable memory 130 with the first device identifier 125. If the first device identifier 125 corresponds to the second device identifier 135 in whole or in part (at 320), the BIOS 230 can permit the normal boot sequence of the computing device 200 (at 330). If at least a portion of the first device identifier 125 fails to corresponds to at least a portion of the second device identifier 135 in whole or in part (at 320), the BIOS 230 can provide at least one indicator 150, including illuminating one or more visual indicators 270, sounding one or more audible indicators 275, or providing one or more RF signals using an RF indicator 280 (at 340).

After providing the at least one indicator, at least a portion of the computing device 200 functionality can be inhibited (at 420). In some embodiments, the complete functionality of the computing device 200 can be inhibited, for example the boot sequence can be halted if at least a portion of the first device identifier 125 fails to correspond to at least a portion of the second device identifier 135. In some embodiments, the performance of the computing device 200 can be compromised, affected, or hindered, thereby impacting one or more features of the computing device 200. For example, where the first device identifier 125 is based in whole or in part on an ETC, if the user boots the electronic device 200 after the ETC has exceeded the time limit imposed by the second device identifier 135, one or more software or firmware routines can be inhibited (at 420). After inhibiting at least a portion of the computing device functionality, the BIOS 230 can then permit the continuation of the boot sequence (at 430).

Though depicted sequential for convenience, discussion and readability, at least some of the actions, steps, or sequences depicted in FIGS. 3 and 4 can be performed in a different order and/or in parallel. Additionally, one or more specific embodiments may perform only a limited number of the actions, steps, or sequences depicted in FIGS. 3 and 4. Additionally, one or more actions, steps, or sequences can be performed using a second processor disposed proximate or remote from the first processor executing all or a portion of the one or more actions, steps, or sequences depicted in FIGS. 3 and 4.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

While the foregoing is directed to embodiments of the present invention, other and further embodiments of the invention may be devised without departing from the basic scope thereof, and the scope thereof is determined by the claims that follow.

We claim the following:

1. A security method, comprising:
comparing a first device identifier disposed within a component with a second device identifier disposed within an immutable memory;
wherein the component and the immutable memory are disposed at least partially within an electronic device, and at least a portion of the first device identifier is immutably disposed within the component;
wherein each of the first device identifier and the second device identifier identify a hardware, software, and firmware configuration of the electronic device, and the comparing determines whether any of the hardware, software, and firmware of the electronic device has been compromised;
starting the electronic device normally if the first device identifier corresponds to the second device identifier; and
providing at least one indicator if the first device identifier fails to correspond to the second device identifier; and
inhibiting a speed of the electronic device in response to the first device identifier failing to correspond to the second device identifier.

2. The method of claim 1, further comprising:
starting the electronic device normally after providing the at least one indicator if the first device identifier fails to correspond to the second device identifier.

3. The method of claim 1, further comprising:
inhibiting at least a portion of the electronic device functionality after providing the at least one indicator if the first device identifier fails to correspond to the second device identifier; and
starting the electronic device.

4. The method of claim 1, further comprising:
activating a security test mode by actuating a dedicated "test" button of the electronic device to initiate comparing the first device identifier with the second device identifier.

5. The method of claim 1, wherein the at least one indicator comprises displaying a visual signal.

6. The method of claim 1, wherein the at least one indicator comprises sounding an audible signal.

7. The method of claim 1, wherein the at least one indicator comprises emitting a Radio Frequency (RF) signal indicating that the first device identifier fails to correspond to the second device identifier.

8. The method of claim 1, wherein the component is a temporal specific module, and the comparing further determines whether an amount of time for which the electronic device is allowed to operate has elapsed.

9. The method of claim 1, wherein the component is selected from the group of components consisting of a temporal specific module, and a geographic specific module.

10. The method of claim 1, further comprising:
including an indicator of a physical location of the electronic device in the first device identifier; and
including an indicator in the second device identifier of a geographic area where operation of the electronic device is permitted or prohibited.

11. The method of claim 1, further comprising including in the first device identifier a temporal indicia associated with the electronic device.

12. A system, comprising:
a component comprising a first device identifier, at least a portion of the first device identifier immutably stored in the component;
an immutable memory comprising a second device identifier; and
an algorithm, which when executed by the system, compares the first device identifier to the second device identifier; and
permits the normal starting of the system if at least a portion of the first device identifier corresponds to at least a portion of the second device identifier; and
provides at least one indicator if the first device identifier fails to correspond to the second device identifier;
wherein each of the first device identifier and the second device identifier identify a hardware, software, and firmware configuration of the electronic device, and the comparing determines whether any of the hardware, software, and firmware of the electronic device has been compromised;
wherein the system inhibits a speed of the system in response to the first device identifier failing to correspond to the second device identifier.

13. The system of claim 12, wherein the component is selected from the group of components consisting of a temporal-specific module, and a geographic-specific module.

14. The system of claim 13, wherein the geographic-specific module comprises an indicator of a physical location of the electronic device in the first device identifier, and the second device identifier comprises an indicator of a geographic area where operation of the electronic device is permitted or prohibited.

15. The system of claim 13, wherein the temporal-specific module comprises, in the first device identifier, a temporal indicia associated with the electronic device.

16. The system of claim 12, wherein the at least one indicator comprises a radio frequency signal.

17. The system of claim 12, further comprising a dedicated "test" button to provide an input configured to initiate execution of the algorithm by a processor.

18. The system of claim 12, wherein the component, immutable memory and a processor are at least partially disposed within an electronic device; and
wherein the electronic device is selected from the group of electronic devices consisting of: a laptop computer, a portable computer, a netbook computer, a slate computer, a personal digital assistant, a cellular communication device, and a handheld gaming device.

19. The system of claim 12, wherein the first device identifier comprises a hash string derived from hashing data corresponding to the hardware, software and firmware configuration of the component.

* * * * *